(12) United States Patent
Miller

(10) Patent No.: US 6,445,839 B1
(45) Date of Patent: Sep. 3, 2002

(54) OPTICAL WAVELENGTH-DIVISION-MULTIPLEXED CROSS-CONNECT INCORPORATING OPTICALLY CONTROLLED OPTICAL SWITCH

(75) Inventor: David A. B. Miller, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 09/435,325

(22) Filed: Nov. 5, 1999

(51) Int. Cl.⁷ .......................... G02B 6/835; G02F 1/017
(52) U.S. Cl. .................................. 385/17; 385/2; 385/8; 359/248
(58) Field of Search .............................. 385/1–3, 8, 14, 385/16, 17, 24; 359/245, 248

(56) References Cited

U.S. PATENT DOCUMENTS

| | | | |
|---|---|---|---|
| 4,525,687 A | | 6/1985 | Chemla et al. ............. 332/7.51 |
| 4,546,244 A | * | 10/1985 | Miller ..................... 250/214 R |
| 4,737,003 A | * | 4/1988 | Matsumura et al. .......... 257/22 |
| 5,339,370 A | * | 8/1994 | Sano et al. .................... 385/2 |
| 5,434,700 A | | 7/1995 | Yoo ............................ 359/332 |
| 5,504,609 A | | 4/1996 | Alexander et al. .......... 359/125 |
| 5,608,566 A | * | 3/1997 | Dutta et al. ................ 359/248 |
| 5,825,517 A | | 10/1998 | Antoniades et al. ........ 359/117 |

OTHER PUBLICATIONS

Yairi et al. High–speed Optically Controlled Surface–normal Optical Switch Based on Diffusive Conduction. Appl. Phys. Lett. Aug. 1999, vol. 75, No. 5, pp. 597–599.*

* cited by examiner

Primary Examiner—John D. Lee
Assistant Examiner—Sarah U Song
(74) Attorney, Agent, or Firm—Lumen Intellectual Property Services

(57) ABSTRACT

A semiconductor device for modulating an optical power light beam with an optical signal light beam contains a detector diode for absorbing the signal beam and a quantum well modulator diode for absorbing the power beam. Both diodes are reverse biased, allowing for absorption of the power beam at photon energies below the band gap energy of the quantum well layer. Absorption of the signal beam creates carriers that screen the field in the detector diode, lowering the bias voltage. Because top and bottom layers of the entire structure are made to be highly conductive, overall voltage is fixed, leading to a simultaneous change of voltage in the modulator diode, altering absorption by electroabsorption mechanisms. In a first embodiment, the diodes are oriented such that decreased voltage in the detector diode leads to decreased voltage in the modulator diode; the device is used as an optically controlled optical switch. Alternately, the voltage in the modulator diode increases, and the device is used as a gated photodetector. The optically controlled optical switch may be incorporated into an optical cross-connect for use in wavelength-division-multiplexed systems. The cross-connect contains an array of switches, and can transfer signal information between beams of different wavelength. A given set of input signals can be selectively switched to a given set of output signals of different wavelength.

21 Claims, 6 Drawing Sheets

OPTICAL WAVELENGTH-DIVISION-MULTIPLEXED CROSS-CONNECT INCORPORATING OPTICALLY CONTROLLED OPTICAL SWITCH

FIELD OF THE INVENTION

This invention relates generally to nonlinear semiconductor optical devices. More particularly, it relates to an ultrafast optically controlled optical switch and crossbar architecture for use in wavelength-division-multiplexed systems.

BACKGROUND ART

Communications systems are increasingly using optical fiber as the transmission medium, because of its low loss, immunity to interference, and extremely large bandwidth. In wavelength-division-multiplexed (WDM) systems, multiple wavelengths are used to allow many communication channels on a single optical fiber, allowing for much greater information transmission and network capacity. Modulated light beams are mixed into the fiber using optical couplers, and demultiplexed at the receiver end by optical filters. It is often necessary to transfer signals between optical networks operating at different wavelengths, and therefore transfer a particular optical signal from one channel to another. Switching information between channels requires the ability to change a particular signal of information from one wavelength to another. Switching of this manner requires both a device that can convert signal wavelengths and a system architecture, incorporating the device, that can be scaled to required capacities.

A WDM optical system is disclosed in U.S. Pat. No. 5,504,609, issued to Alexander et al. This system includes complex remodulators for transferring a signal from an input wavelength to an output wavelength. Each remodulator contains a photodiode or similar means for converting an optical input signal to an electrical signal, which is then amplified, filtered, and amplified again. The resultant electrical signal is used to modulate an optical source by exploiting the electro-optical effect in a waveguiding medium to create an amplitude-modulated output signal. The combination of electronic and optical elements required in the system of Alexander et al. greatly limit the net throughput in the system, and do not effectively take advantage of the increased bandwidth provided by the optical fiber. The remodulators also dissipate large amounts of power and make large arrays of switches impractical.

An all-optical wavelength converter is provided in U.S. Pat. No. 5,434,700, issued to Yoo. The device acts as a nonlinear optical mixer to combine an input signal with a pump signal to generate an output signal of a different wavelength. Specifically, the output frequency is the difference between the pump frequency and the input frequency. As is explicitly stated in the description, the pump frequency determines the frequency shift, and therefore the device cannot be used to convert multiple input channels to multiple output channels selectively. Instead, a separate device is required to convert between each input frequency and output frequency, requiring a set of parallel converters operating between neighboring WDM networks. Of course, this system cannot practically be scaled to WDM systems containing large numbers of channels. Furthermore, systems based on these techniques dissipate large amounts of power and are therefore not feasible for large-scale systems.

The technique employed by the device of Yoo, difference frequency generation, is used in a parametric wavelength interchanging cross-connect, described in U.S. Pat. No. 5,825,517, issued to Antoniades et al. The cross-connect of Antoniades et al. combines 2×2 spatial optical switches with the wavelength converters of Yoo to allow arbitrary switching of signals among the channels of the WDM network. By selecting particular wavelengths of pump sources, the wavelength converters can be made to interchange signals between two channels in a single device. That is, each wavelength converter in the cross-connect takes two input signals with wavelengths $\lambda_1$ and $\lambda_2$, and produces two output signals of wavelengths $\lambda_2$ and $\lambda_1$, transferring the information carried in input signal $\lambda_1$ to output signal $\lambda_2$, and vice versa. Switching between systems with more than two channels requires complicated networks of 2×2 spatial switches and wavelength converters. Because each wavelength converter is limited to a few predetermined frequencies, arbitrary switching requires a series of wavelength converters, each of which has a different pump frequency. In addition, the cross-connect of Antoniades et al. uses only a single set of WDM wavelengths for both input and output signals, and does not allow for truly arbitrary switching.

Optical switches for modulating optical signals have been disclosed in the prior art. These switches take advantage of the electroabsorption effect in devices that operate on picosecond time scales. A high-speed electro-optical modulator is disclosed in U.S. Pat. No. 4,525,687, issued to Chemla et al. This semiconductor device contains a multiple quantum well structure across which an electric field is applied. The applied electric field increases absorption for photon energies just below the band gap by the quantum-confined Stark effect (QCSE). As the electric field is increased further, the band edge shifts to lower photon energies. By carefully controlling an applied voltage, and therefore electric field, optical properties of the device can be changed at will. An optical signal with photon energy just below the band gap of the quantum well structure is absorbed or transmitted with just a small change in the applied voltage. Because this device is an electrically-controlled optical modulator, it cannot be used alone to provide the wavelength conversion required in WDM systems. The desired result can only be produced by combining this device with a photodetector for generating the required electrical signal in response to the optical signal. As with the system of Alexander et al., the combination is complicated, incurs high power dissipation, cannot operate at the required switching speeds, and is not easily integrated into arrays.

There is still a need, therefore, for a wavelength converting switch that can be used in an architecture that allows for a complete cross-connect, in which the signal from any input wavelength can be used to modulate the output at any wavelength, with multiple different wavelengths of data in and out of the cross-connect system.

OBJECTS AND ADVANTAGES

Accordingly, it is a primary object of the present invention to provide an optical wavelength-converting cross-connect that allows for arbitrary switching of information between input and output signals.

It is a further object of the invention to provide a high-speed optically controlled optical switch for transferring signal information between an input light beam and an output light beam.

It is an additional object of the invention to provide a wavelength-converting switch that requires very low electrical and optical power inputs by exploiting the quantum-controlled Stark effect (QCSE).

It is another object of the present invention to provide an optical switch with controllable picosecond switching time scales.

It is an additional object of the present invention to provide an optical device that is easily integrated with the required electronics.

It is a further object of the present invention to provide an ultrafast gated photodetector that produces a signal requiring minimal processing.

SUMMARY

These objects and advantages are attained by a semiconductor device for modulating an optical power light beam at a first wavelength with an optical signal light beam at a second wavelength. The device consists of two diodes: a detector diode, containing a detector absorbing layer for absorbing the optical signal beam; and a modulator diode, containing a modulator absorbing layer for absorbing the optical power beam. The modulator absorbing layer has an electric field-dependent absorption coefficient; the two diodes are in sufficient electrical communication that this coefficient is altered by absorption of the optical signal beam by the detector diode. Altering the coefficient modulates absorption of the optical power beam, and therefore transfers an information signal carried by the optical signal beam onto the optical power beam. Absorption of the optical power beam also generates a photocurrent in the modulator diode, and the device may also contain means for collecting the photocurrent, so that it acts as a gated photodetector. Preferably, the first and second wavelengths of the two light beams are substantially unequal.

Preferably, the optical power light beam propagates into a region of the modulator absorbing layer, and the optical signal light beam propagates into a region of the detector absorbing layer. These regions are within a short distance from one another, preferably less than the power beam diameter of the optical power beam, and also above one another. Preferably, this short distance is less than 20 $\mu$m, and most preferably less than 5 $\mu$m.

Preferably, the device contains means for applying a detector voltage to the detector diode and a modulator voltage to the modulator diode; most preferably, both diodes are reverse biased. The applied electric field shifts the absorption coefficient and enables absorption of the optical power light beam by the modulator absorbing layer. Preferably, the modulator absorbing layer is a quantum well or, more preferably, a plurality of quantum wells, allowing for absorption by the quantum-controlled Stark effect. Alternately, the modulator absorbing layer is a bulk semiconductor, allowing for absorption by the Franz-Keldysh effect.

The detector diode contains an upper contact layer and a lower contact layer, and the detector absorbing layer is positioned between these two contact layers. Similarly, the modulator diode contains an upper cladding layer and a lower cladding layer, and the modulator absorbing layer is positioned between these two cladding layers. The lower contact layer and upper cladding layer are in substantially planar parallel physical contact, providing the electrical communication of the device. Preferably, the upper contact layer and lower cladding layer have sufficiently high electrical conductivities that a voltage between the two is substantially constant, even as the voltage within the diodes changes as light beams are absorbed. Preferably, the upper cladding layer and lower contact layer have predetermined resistivities chosen to control the rate of diffusive electrical conduction in the layers. The resistances per square of the upper cladding layer and lower contact layer are preferably substantially larger than the resistances per square of the lower cladding layer and upper contact layer.

In a first embodiment, the lower contact layer and upper cladding layer are identical, and the upper contact layer and lower cladding layer are of the same semiconductor doping type. Preferably, the upper contact layer and lower cladding layer are n-type semiconductor material, and the upper cladding layer is p-type semiconductor material. Absorption of the optical signal beam by the detector diode creates electrical carriers that decrease the detector voltage and decrease the modulator voltage, altering the absorption coefficient and leading to decreased absorption of the optical power beam. In a second embodiment, the lower contact layer and upper cladding layer are of opposite semiconductor doping type. Preferably, the upper contact layer and upper cladding layer are n-type semiconductor material, and the lower contact layer and lower cladding layer are p-type semiconductor material. Absorption of the optical signal beam by the detector diode creates electrical carriers that decrease the detector voltage and increase the modulator voltage, altering the absorption coefficient and leading to increased absorption of the optical power beam.

Also provided in the present invention is an optical cross-connect for modulating a set of N optical power light beams with a set of N optical input signals to generate a set of M optical output signals. The optical input signals carry signal information that is transferred to the optical output signals, which are amplitude-modulated versions of the optical power beams. Preferably, the system is used for switching channels in a wavelength-division multiplexed system. In this case, the optical input signals are of different wavelengths from each other, and the optical power beams are of different wavelengths from each other, and different wavelengths from the optical input signals. The cross-connect consists of an array of the optically controlled optical switches described above, each of which is capable of modulating at least one power beam with at least one input signal to produce an optical output signal, so that the cross-connect can transfer signal information carried by each of the optical input signals to each of the optical output signals. The cross-connect also contains electrical means for selectively activating each switch by applying a detector voltage across the detector diodes and a modulator voltage across the modulator diodes. Preferably, the cross-connect has N rows and M columns of switches. Preferably, parallel optical waveguides are used to deliver the optical power beams to and the optical output signals from the optical switches. Each waveguide passes through a distinct row or column of the cross-connect. A second set of parallel optical waveguides may be used to deliver the optical input signals to the switches, and the two sets are substantially perpendicular to one another.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention.

Figure 1:
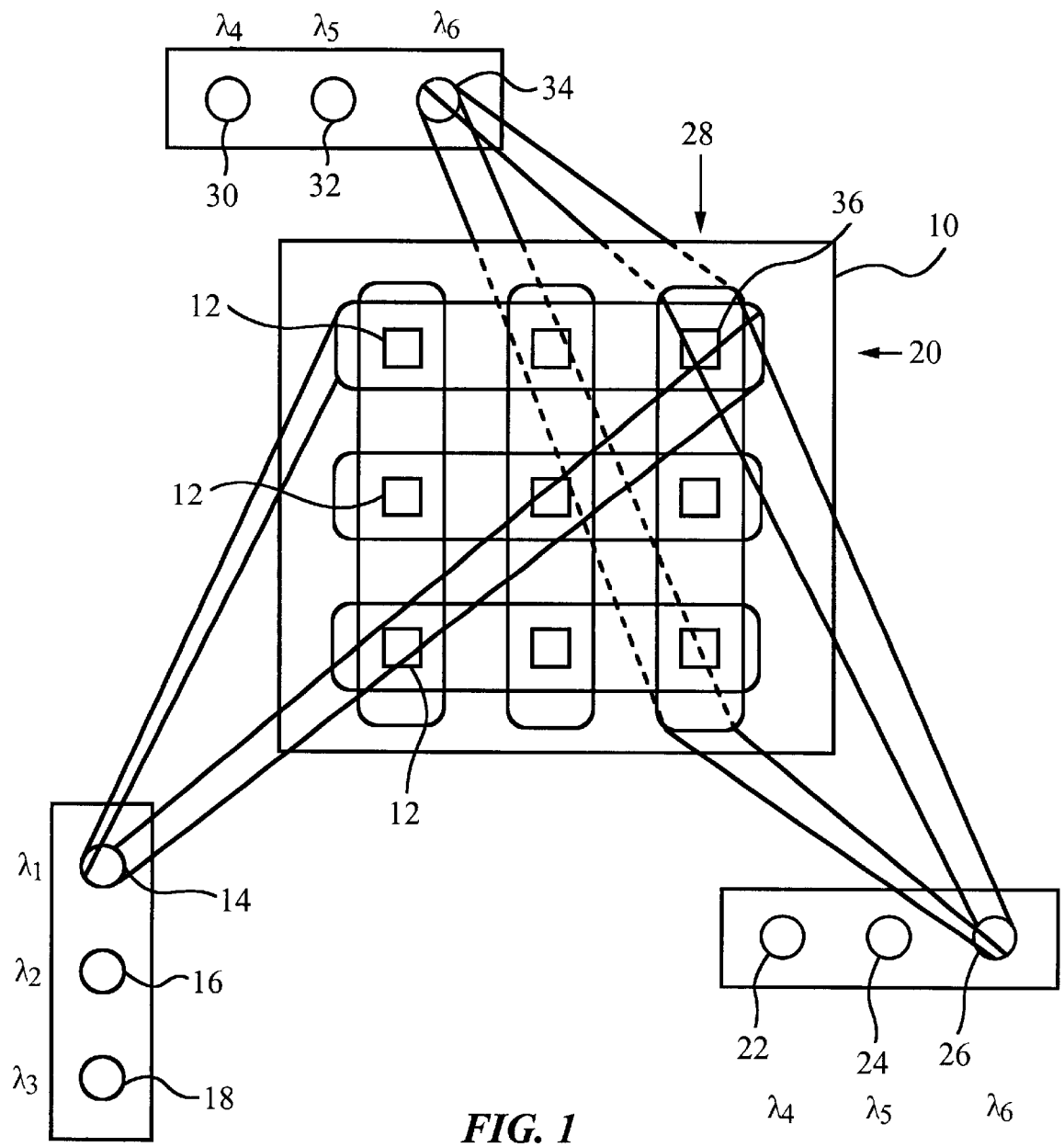
FIG. 1 is a schematic diagram of a wavelength-division multiplexed system incorporating an optical cross-connect of the present invention.

FIG. 1 illustrates a particular embodiment of an optical crossbar architecture of the present invention, an optical cross-connect 10 containing a matrix of optically controlled optical switches 12. Switches 12 are located at the cross points of optical cross-connect 10. Each switch 12 is capable of transferring a signal from one channel (i.e. wavelength) to another. Optical cross-connect 10 is further enabled by an electrical control function that sets whether a particular optically controlled optical switch 12 is activated for use or not.

In FIG. 1, three optical input signals 14, 16, and 18 are shown, each of which may have a different signal wavelength. Specifically, these wavelengths are $\lambda_1$, $\lambda_2$, and $\lambda_3$. Each input signal is spread by optics over a horizontal row of cross-connect 10. For example, optical input signal 14 is spread over horizontal row 20. There are also three optical power light beams 22, 24, and 26, each of which may have a different wavelength. Specifically, these wavelengths are $\lambda_4$, $\lambda_5$, and $\lambda_6$. A given optical power beam is spread by optics over a vertical column of cross-connect 10. For example, optical power beam 26 is spread over column 28. Optics are also arranged so that any light passing through a given vertical column of cross-connect 10 is collected into a single optical output signal 30, 32, or 34.

The optics for spreading the light into rows or columns of cross-connect 10 is not shown explicitly, nor is the optics for gathering light from a particular vertical column shown explicitly, but techniques for accomplishing this are well known to those skilled in the art, including, for example, the use of cylindrical lenses.

The optics in FIG. 1 is such that if any of the optically controlled optical switches 12 is transparent, optical power beam 22, 24, or 26 is passed through to become the corresponding optical output signal 30, 32, or 34, respectively. Cross-connect 10 is substantially opaque unless a particular switch 12 is turned on, in which case that switch becomes a substantially transparent optical window.

For a switch 12 to become transparent requires two conditions. First, switch 12 must be enabled by a second, enabling control. This enabling control is not shown explicitly in FIG. 1 for reasons of clarity. For example, a suitable enabling control would be an electrical voltage applied to the switch. When this switch is enabled, its optical transparency is controlled by the optical input signal 14, 16, or 18 that also shines on the optically controlled optical switch 12. Hence, when a given optically controlled optical switch 12 is enabled, optical power beam 22, 24, or 26 that is illuminating that switch becomes modulated in response to an optical input signal 14, 16, or 18, also illuminating the same switch. By this means a signal at a given input wavelength $\lambda_1$, $\lambda_2$, or $\lambda_3$ can be used to modulate the power of optical output signal 30, 32, or 34 at any chosen optical output wavelength $\lambda_4$, $\lambda_5$, or $\lambda_6$. For example, if switch 36 in FIG. 1 is enabled, optical power beam 26 at wavelength $\lambda_6$ is modulated in response to optical input signal 14 at $\lambda_1$, and this modulated signal appears as optical output signal 34 at wavelength $\lambda_6$.

Optical cross-connect 10 is an example of the general class of switching systems known as crossbar switches, and is capable of arbitrary switching functions between optical input signals 14, 16, or 18 and optical output signals 30, 32, or 34. Hence this kind of switching system is capable of providing the desired ability to switch signals between optical wavelengths in multiple wavelength optical networks. It should be understood that optical cross-connect 10 also operates even if any of the wavelengths $\lambda_1$, $\lambda_2$, $\lambda_3$, $\lambda_4$, $\lambda_5$, or $\lambda_6$ is the same as any other. If these wavelengths are not distinct, the cross-connect function is still being performed, as may be useful for switching signals between different spatial channels such as optical fibers.

Figure 2:
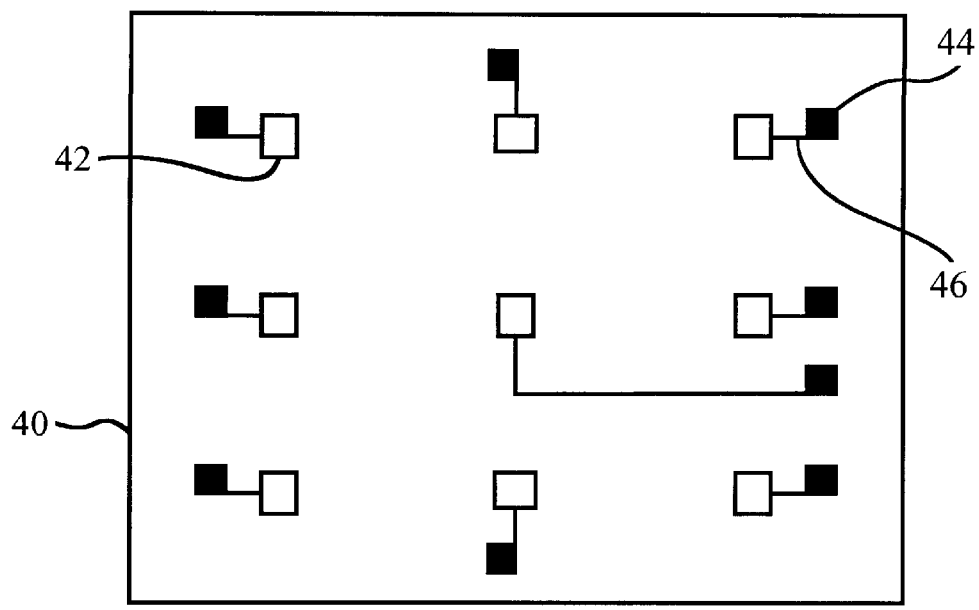
FIG. 2 is a front plan view of an optical cross-connect illustrating the wiring of electrical control signals.

FIG. 2 shows an optical cross-connect 40 containing optically controlled optical switches 42. FIG. 2 also illustrates an exemplary manner in which electrical control signals may be connected to switches 42. In particular, electrical bonding pads 44 are connected to switches 42 by electrical wired connections 46.

Figure 3:
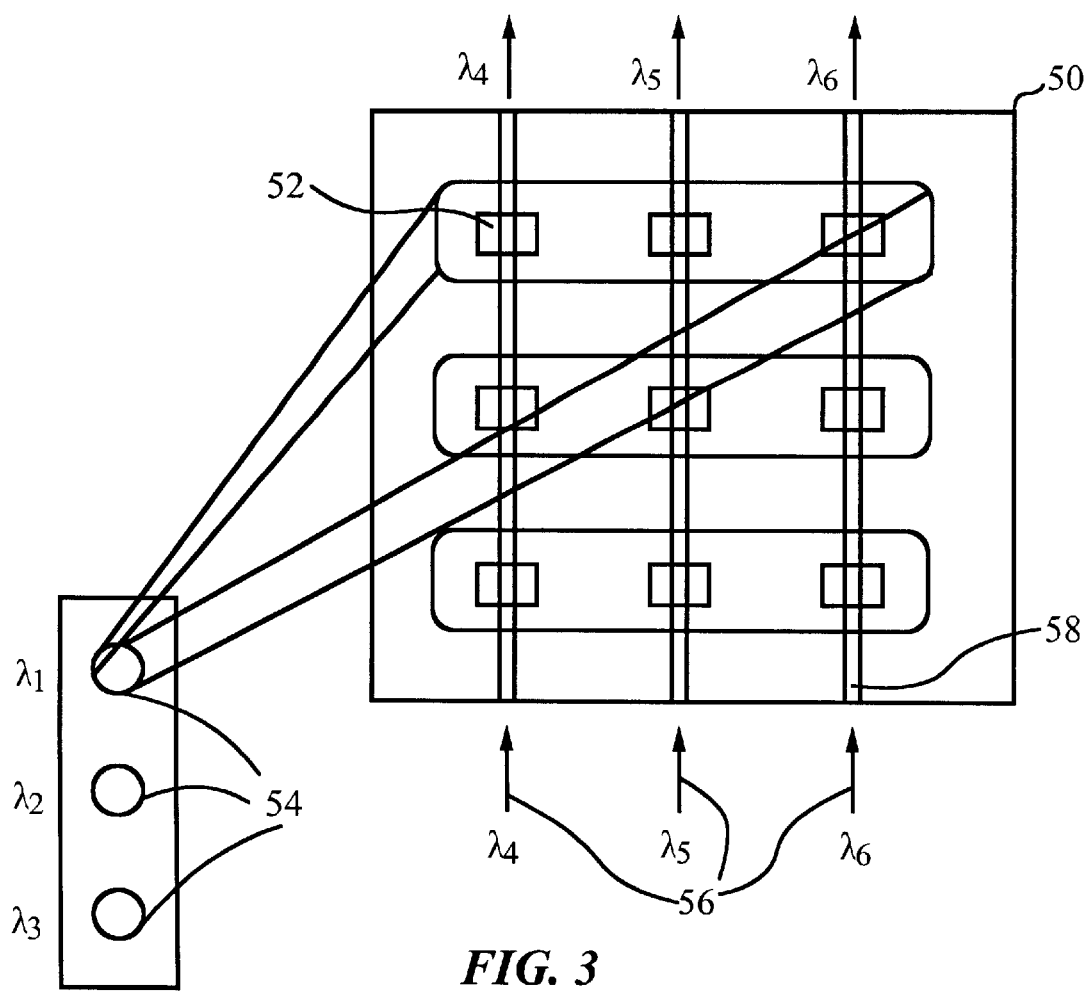
FIG. 3 is a schematic diagram of a wavelength-division multiplexed system incorporating a preferred embodiment of an optical cross-connect of the present invention.

Preferred, embodiment of an optical cross-connect 50 containing switches 52 for use in this optical wavelength-division-multiplexed cross-connect switching system is shown in FIG. 3. In this embodiment, optical power beams 56 are transported into and through optical cross-bar 50 using optical waveguides 58, as opposed to the "free-space" system shown in FIG. 1. As shown, optical waveguides 58 are substantially parallel, and each one passes through a distinct column of cross-connect 50. Optical cross-connect 50 is identical to optical cross connect 10 in all other ways.

Figure 4:
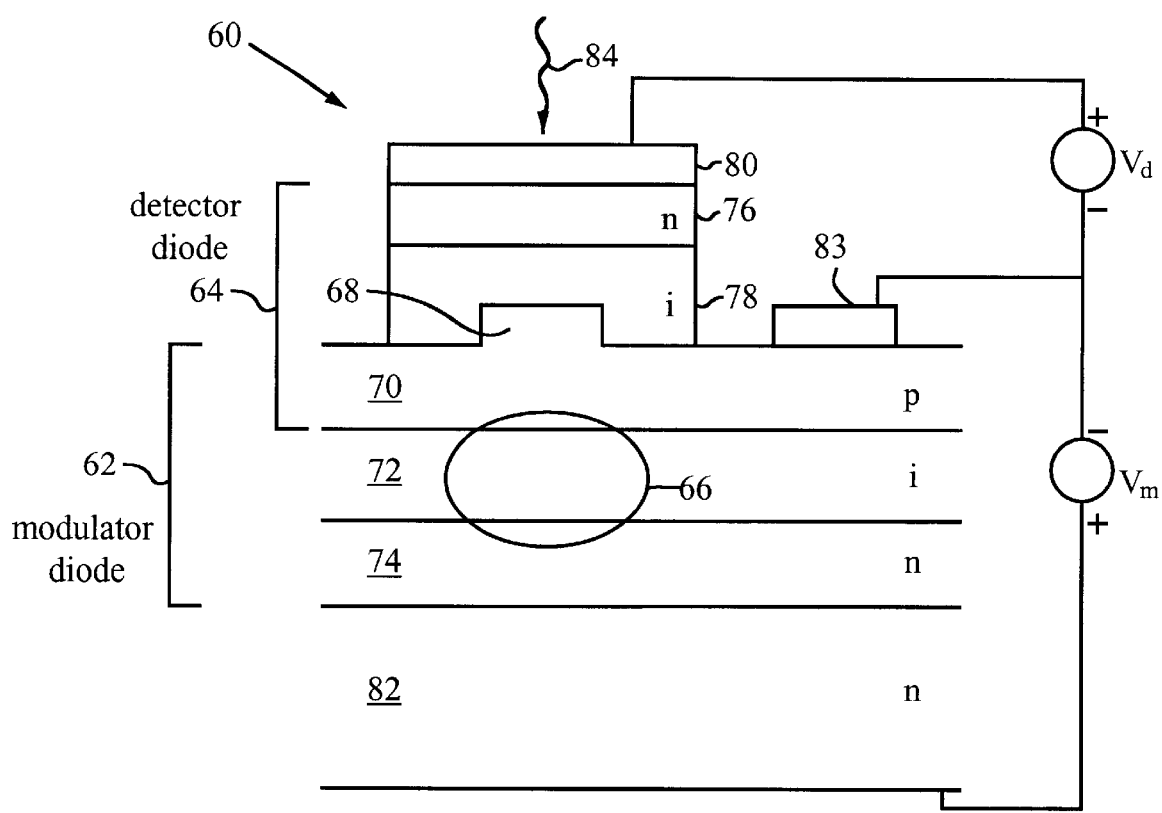
FIG. 4 is a side plan view of a preferred embodiment of an optically-controlled optical switch of the present invention.
Figure 5:
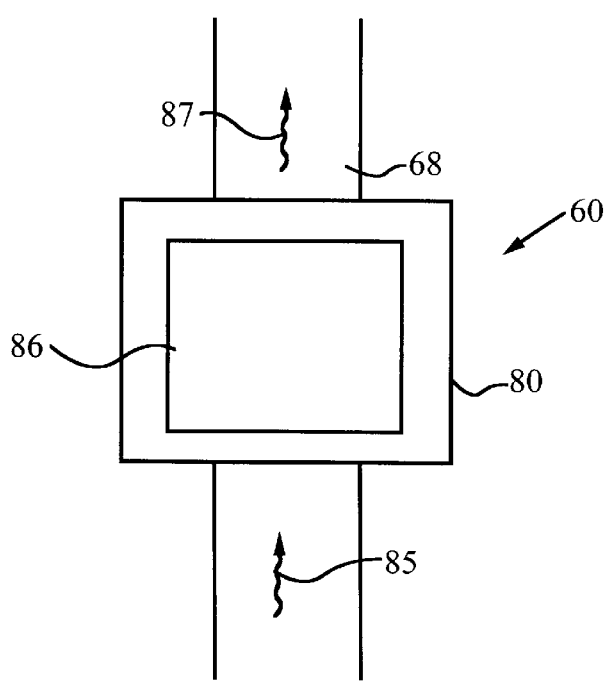
FIG. 5 is a top plan view of the switch of FIG. 4.
Figure 6:
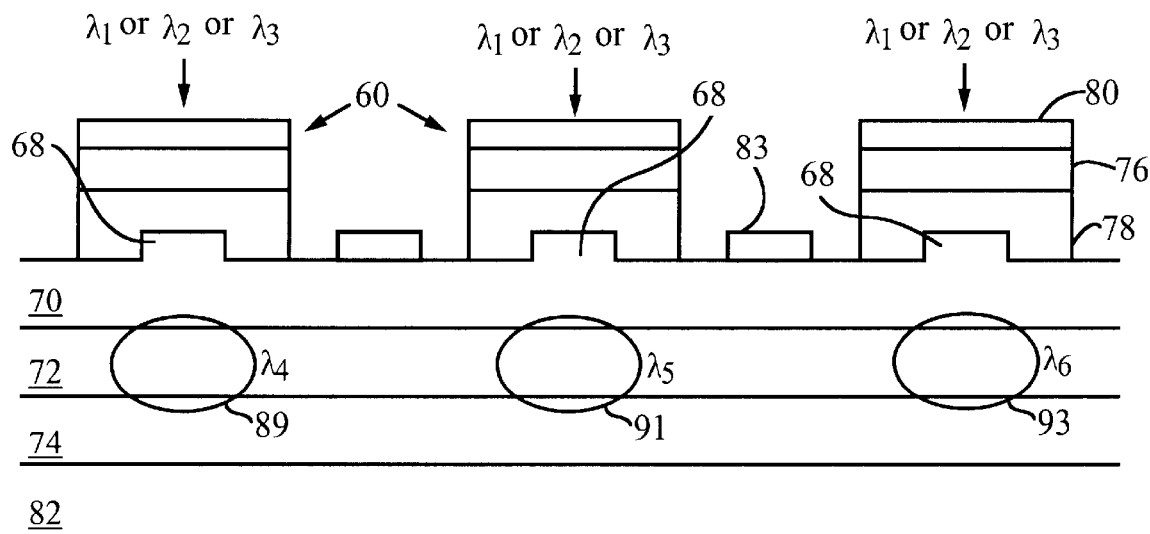
FIG. 6 is a side plan view of an optical cross-connect of the present invention incorporating the switches of FIG. 4.

A particular, preferred embodiment of optically controlled optical switch 52 is shown in FIGS. 4, 5, and 6. In particular, optically controlled optical switch 60 is shown in cross-section in FIG. 4 and in top plan view in FIG. 5. FIG. 4 illustrates an exemplary layer structure for switch 60 containing a quantum well modulator diode 62 together with a photodetector diode 64. Switch 60 can operate at very high modulation rates with low optical powers. FIG. 6 shows a plan view of the top side of optical cross-bar 50 of FIG. 3 containing a matrix of switches 60.

Switch 60 can be made from semiconductor materials using layered growth techniques such as molecular beam epitaxy (MBE) or metal-organic chemical vapor deposition (MOCVD) well known to those skilled in the art. Various different semiconductor material systems are useful for this switch depending on the wavelength range of interest. For example, GaAs and GaAlAs would be a useful material system for wavelengths near 850 nm. InP and InGaAsP or InP and InGaAlAs (or combinations of these materials and also InGaAs) would be suitable materials systems for wavelengths near 1.5 μm, as appropriate for many optical communications systems. Other possible materials systems are well known to those skilled in the art, including other semiconductor materials made from Group III and Group V chemical elements and from Group II and Group VI chemical elements.

FIGS. 4, 5, and 6 show an exemplary method for the confinement of optical modes using waveguide ridges 68. Waveguides allow for strong absorption with a narrow intrinsic layer of modulator diode 62, allowing for rapid transport through modulator diode 62 and very high speed operation. FIGS. 4 and 6 indicate an exemplary form and placement of modes 66 and 89, 91, and 93, corresponding to wavelengths $\lambda_4$, $\lambda_5$, and $\lambda_6$. It is to be understood that the mode form is not a simple ellipse as shown in FIGS. 4 and 6, as is well known to those skilled in the art, being instead a continuous distribution of optical intensity in an optical beam, such as a Gaussian distribution. Other methods for confinement of optical modes in such structures are well known to those skilled in the art. Furthermore, more sophisticated structures can be fabricated in which a larger number of layers of different refractive indices and conductivities are used to improve performance of the optical wave guiding without otherwise affecting the underlying principle of operation of the device, as is well known to those skilled in the art.

In the embodiment of FIGS. 4 and 5, switch 60 is used to transfer an information signal carried by an optical signal pulse 84 to an optical power light beam 85 to generate an intensity-modulated version of optical power light beam 85, optical output light beam 87. An optical signal light beam contains a series of optical signal pulses 84, by which the signal information is carried. For WDM systems, optical power light beam 85 is usually, but not necessarily, a steady light beam. Optical power light beam 85 of FIG. 5 is incident parallel to the layers of modulator diode 62 and shown in FIG. 4 as mode 66. Modulator diode 62 consists of an upper cladding layer 70, a modulator absorbing layer 72, preferably a quantum well material, and a lower cladding layer 74. These are seen to be doped in such a fashion as to form an n-i-p diode. A bias voltage $V_m$ is chosen to reverse bias modulator diode 62. Such reverse bias can apply large electric fields over the quantum wells and induce absorption for photon energies below the band gap energy through the quantum-confined Stark effect (QCSE) electroabsorption mechanism. Through this mechanism, the band edge is shifted to lower photon energies with increasing electric field, as described in D. A. B. Miller, D. S. Chemla, T. C. Damen, A. C. Gossard, W. Wiegmann, T. H. Wood, and C. A. Burrus, "Electric Field Dependence of Optical Absorption Near the Bandgap of Quantum Well Structures," *Phys. Rev.* B32, 1043–1060 (1985), which is herein incorporated by reference.

Detector diode 64 consists of an upper contact layer 76, a detector absorbing layer 78, and upper cladding layer 70. Detector diode 64 is also seen to be an n-i-p diode. To enable switch 60, detector diode 64 is also controlled with a voltage $V_d$, and in this embodiment, detector diode 64 is reverse biased to enable the operation of optically controlled optical switch 60. If detector diode 64 is not sufficiently reverse biased, it will not function efficiently as a photodetector, and any photodetection that takes place in it will not efficiently cause the desired operation of the device as an optically controlled optical switch. In the enabled, reverse biased condition, detector diode 64 can function efficiently as a photodetector. FIG. 4 also shows two other layers: a top contacting material 80 and a substrate 82. Top contacting material 80 is also shown in FIG. 5. Optical signal pulse 84 passes through a window 86 in contacting material 80 and is incident on upper contact layer 76.

Figure 7:
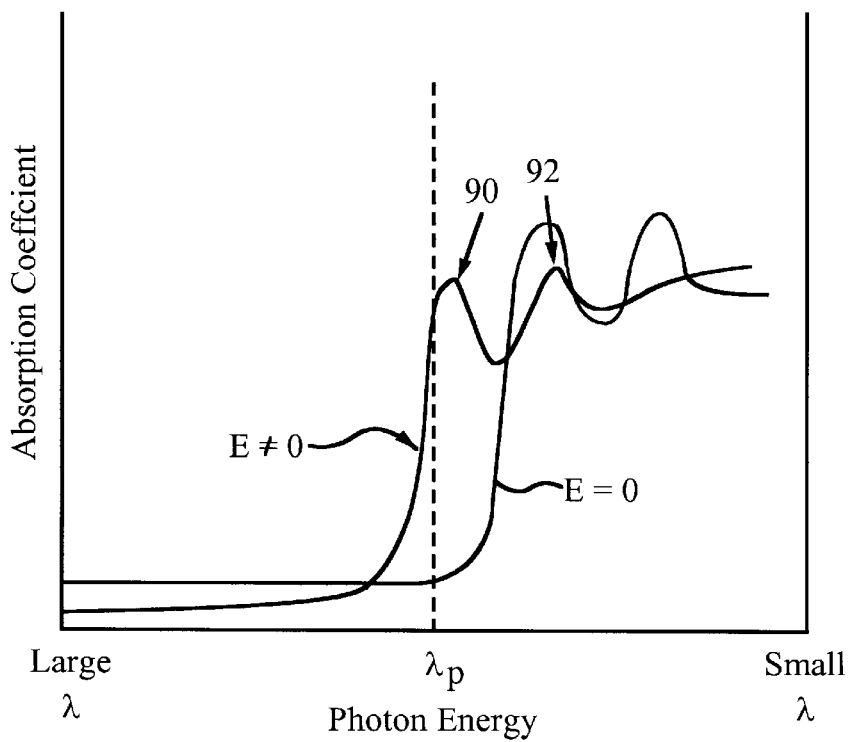
FIG. 7 is a graph of absorption coefficient versus photon energy for a quantum well absorbing layer under an applied electrical field.

Before considering operation of switch 60, it is helpful to consider the effect of an applied electric field on absorption in a quantum well medium. This effect (QCSE) is responsible for the desired effect of switch 60—modulation of absorption of optical power light beam 85 by modulator absorbing layer 72. FIG. 7 is a graph of absorption coefficient α as a function of photon energy hv for a quantum well without an applied electric field and with an applied electric field. Peaks 90 and 92 correspond to heavy hole and light hole exciton absorption peaks, respectively. As illustrated in FIG. 7, an increasing electric field dramatically shifts the band edge to lower photon energies. Consider an optical power beam with wavelength $\lambda_p$. Without an applied voltage, the optical beam falls in a region in which α is negligible, and it will be almost completely transmitted. However, with an applied field, α at $\lambda_p$ is finite and relatively large, and the beam is substantially absorbed. Note that increased absorption under increased applied field is true for photon energies below the band gap of the unbiased quantum well material.

Operation of switch 60 may be understood with reference to FIGS. 4 and 5 by considering the effect of optical signal pulse 84 shining through window 86. In particular, if optical signal pulse 84 shines on detector diode 64, this light is absorbed in the detector absorbing layer 78, generating mobile electrons and holes. These electrons and holes separate under the action of the reverse bias field in detector diode 64. This separation of charge leads to a reduction of voltage within detector diode 64. In switch 60, upper contact layer 76 and lower cladding layer 74 in conjunction with substrate 82 are chosen to have low resistance. As a result of this low resistance, the overall voltage between upper contact layer 76 and lower cladding layer 74 and substrate 82 is rapidly restored to its former value. In fact, by proper choice of materials for upper contact layer 76, lower cladding layer 74, and substrate 82, this restoration can be made to occur much more quickly than any time scale of interest in switch 60; voltage between upper contact layer 76 and substrate 82 is therefore essentially constant and set by the bias voltages.

In fact, operation of switch 60 depends on this effectively constant voltage: if charges move within detector diode 64 to reduce the voltage there, they must also move elsewhere to maintain the constant overall voltage. As a consequence of the voltage reduction in detector diode 64, the reverse bias voltage across modulator diode 62 is also reduced locally within the structure. This reduction of voltage across the modulator diode changes the optical absorption of modulator absorbing layer 72, thus modulating optical power beam 85 passing through modulator diode 62 in response to optical signal pulse 84 landing on detector diode 62, giving the desired operation of the switch 60.

In a preferred embodiment of switch 60, the optical absorption of modulator diode 62 decreases as the reverse bias is decreased. Such a decrease in absorption with decreasing reverse bias means that the power in optical output beam 87 changes in the same sense as the power in the signal beam, so that there is no logical inversion in the control of optical output beam 87 by optical signal beam 84. As illustrated in FIG. 7, reduction in absorption as reverse bias is decreased is typically found if the photon energy of optical power beam 85 is chosen to be below the band gap energy of the unbiased quantum well material of modulator absorbing layer 72. For typical wavelengths used in communications systems, e.g. 1.5 μm, manufacture of absorbing layers with suitable band gaps is well known to those skilled in the art.

Of course, the local reduction in voltages only lasts for a finite time. The change in the voltages across both detector diode 64 and modulator diode 62 remains until sufficient charge is able to flow within upper cladding layer 70 to substantially restore the local voltage distribution. A side contacting material 83 is used to make electrical connection to upper cladding layer 70 so as to set the necessary bias voltage on the device and to provide a path for net charge to flow into and out of the device. For the desired operation of switch 60, the resistance of material in upper cladding layer 70 is carefully controlled, and is designed not to be too highly conducting. When such charge has flowed, the original voltages will be restored across both detector diode 64 and modulator diode 62. Before such time has elapsed, however, the net effect of shining optical signal pulse 84 on detector diode 64 has been to change the voltage across modulator diode 62, which leads to a change in absorption in modulator diode 62 and therefore modulates the transmission of light through modulator diode 62. The side contacts are not explicitly shown in FIGS. 1 and 3, although methods of applying and laying out such side contacts are well known to those skilled in the art. In a preferred embodiment, side contacts 83 are also a means by which electrical control signals are applied to the switch as illustrated in FIG. 2. In this preferred embodiment, the upper contact layers 76 of every switch are all connected to a common bias voltage $V_{top}$ through the top contacting material 80. The lower cladding layer 74 is a common layer to all the switches and is electrically connected to a common bias voltage $V_{bottom}$. To enable a given switch, a control voltage $V_{control}$ applied to side contacting material 83 is changed so as to substantially reverse bias modulator diode 62.

So that switch 60 is ready to receive an additional, possibly different, signal bit, it is important that the recovery mechanism from charge flowing through upper cladding layer 70 will have taken place before the next bit of signal information arrives. The mechanism of recovery, diffusive electrical conduction, may occur on picosecond time scales, much faster than the time scales for carrier transport laterally in upper cladding layer 70, and depends in part upon the resistivity of upper cladding layer 70. Ensuring that the recovery occurs as desired is achieved by appropriate design of this resistivity. For example, an AlGaAs with doping on the order of $10^{18}$ cm$^{-3}$ can have a resistance per square on the order of 1 kΩ. Such design depends on the bit rate that must be accommodated.

Figure 8A:
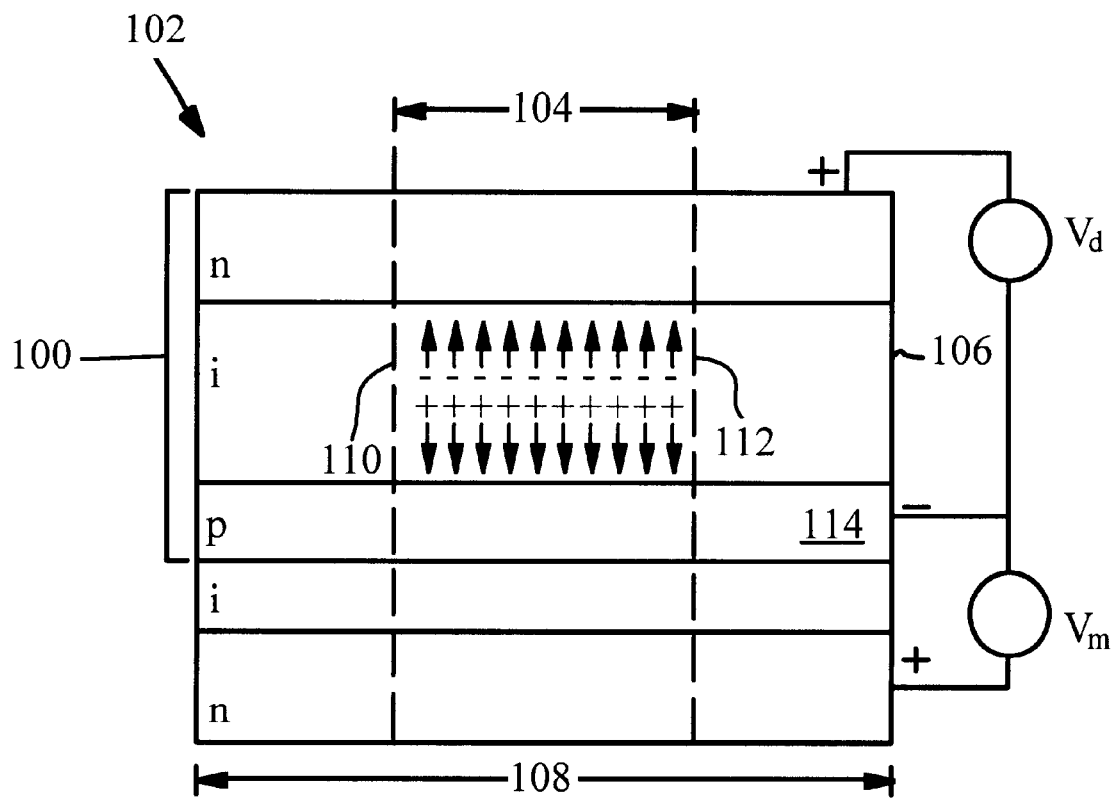
FIG. 8A is a schematic side plan view of an optical switch of the present invention indicating separation of created charge carriers.
Figure 8B:
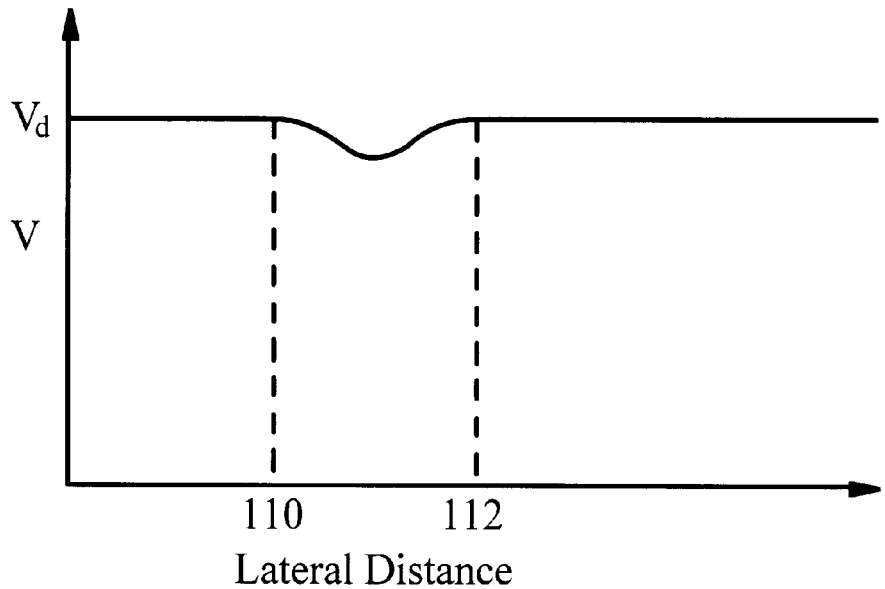
FIG. 8B is a graph of bias voltage versus lateral distance of an absorbing layer during field screening.

The recovery rate also depends upon the spot size of the incident signal pulse in the detector absorbing layer. FIG. 8A illustrates a detector diode 100 of an optical switch 102. Detector absorbing layer 106 absorbs a light beam with a beam diameter 104. As described above, light beam diameter 104 is not discrete, but is a commonly-defined measure of diameter of a continuous distribution (e.g. Gaussian) of light. Detector absorbing layer 106 has a lateral surface area defined in part by absorbing layer width 108 and extending into the page. Note that the beam area is substantially smaller than the lateral surface area. When a beam is absorbed by detector absorbing layer 106, carrier generation occurs primarily in the regions between lines 110 and 112. FIG. 8B shows the voltage across detector absorbing layer 106 in the direction of arrow 108. Note that the local reduction of bias voltage does not occur across the entire layer, but is rather defined by lines 110 and 112. A similar plot can be made for the voltage across the modulator diode, which also changes only over a finite area and is similarly reduced in magnitude in the region between lines 110 and 112. Thus it is preferable to have the optical power beam propagate into a region substantially between lines 110 and 112 so that it is within a region where the voltage across the modulator diode is changed in response to the incident signal beam. The optical power beam therefore has a power beam diameter approximately equal to the distance between lines 110 and 112. If the optical power beam does propagate into the region between lines 110 and 112, then the detector absorbing region is said to be substantially above the modulator absorbing region. Note that the term "above," as used here, applies both when the detector diode is on top of the modulator diode, and when the modulator diode is on top of the detector diode, and refers to the alignment of the boundaries of the two absorbing regions. It is not necessary that the optical power beam passes exactly between lines 110 and 112. It is sufficient that the optical power beam and the optical signal beam that carries the optical signal pulses are close horizontally (that is, in the direction of arrow 108 in FIG. 8A). The voltage distribution does spread out horizontally as it relaxes, allowing some latitude in the precise horizontal positioning of the optical power beam and the optical signal beam. Optimal operation of the device occurs when the propagation regions in the two absorbing layers are separated by only a short distance, at most the power beam diameter, but preferably less. The power beam diameter should be at most 20 μm, and may be below 5 μm.

Voltage recovery relies on diffusive electrical conduction in upper cladding layer 114. Larger beams cause a voltage change across a larger area of the layers, and therefore require a longer recovery time. Preferably, for typical communications applications, spot sizes are less than 20 μm in diameter, and more preferably below 5 μm. It is possible to perform a more sophisticated analysis of the recovery with distributed resistance and capacitance effects included. This has been discussed in Livescu et al., "High-speed absorption recovery in quantum well diodes by diffusive electrical conduction," *Appl. Phys. Lett.*, 54, 748–750 (1989); in Yairi et al., "High-Speed Quantum Well Optoelectronic Gate Based on Diffusive Conduction Recovery," in *Optics in Computing '98*, Pierre Chavel, David A. B. Miller, Hugo Thienpont, Editors, (Optics in Computing '98 Conference, Brugge, Belgium (Jun. 17–20, 1998)), *Proc. SPIE*, Vol. 3490, 10–13 (1998); and in Yairi et al., "High-speed, optically controlled surface-normal optical switch based on diffusive conduction," *Appl. Phys. Lett.*, 75, 597–599 (1999), all of which are herein incorporated by reference.

The characteristic time $\tau_c$ for diffusive electrical conduction recovery is given as $$\tau_c = \frac{w^2 R_{SQ} C_A}{8}$$

where w is the effective radius of the beam of signal pulses, $R_{SQ}$ is the number of ohms per square of the resistive layers, and $C_A$ is the capacitance per unit area. The number of ohms per square is the resistance measured between two opposite edges of a square sheet of material. By the nature of normal resistive behavior, the resistance measured this way is essentially independent of the size of the square. For the present exemplary embodiment with highly conducting lower cladding layer 74 and upper contact layer 76, the value of $R_{SQ}$ is approximately that of upper cladding layer 70. This is because $R_{SQ}$ of upper cladding layer 70 is substantially larger than $R_{SQ}$ for lower cladding layer 74 and upper contact layer 76. The appropriate value for $C_A$ is approximately the sum of the capacitance per unit area of detector diode 64 and modulator diode 62. $\tau_c$ determines approximately the "turn-off" time of the device. As described in the incorporated references, this time may be engineered over a broad range.

The entire operation time of device 60 is determined by both the relaxation time described above ("turn-off" time), which can be engineered to be 10 ps or less, and the time for initial field screening ("turn-on" time), caused by separation of the generated carriers. The entire time of operation will set a limit on how often signal pulses may usefully be applied to the device. For low carrier density, in which there are not enough carriers created to screen the field completely in detector diode 62, field screening occurs when the carriers have transported across the entire region. The total rate is therefore determined by the saturated drift velocity of the carriers, approximately $10^7$ cm/s. For a structure of approximately 1 μm thickness, field screening is completed in about 10 ps. If, however, carrier densities are more than large enough to screen the entire field in detector absorbing layer 78, the carriers need only move some fraction of the thickness of detector absorbing layer 78 to screen the field completely. For example, to screen a field of $10^5$ V/cm with a created carrier density of about $10^{18}$ cm$^{-3}$ requires that the carriers move less than 10 nm, a process that might occur on a timescale about 100 fs. This ability to engineer the relevant time scales is essential for switches to be used in WDM systems. Without this ability, provided by the design of conductivities and thicknesses of the diode layers, it would not be possible to ensure that the switch would be able to function at required bit rates.

Note that the choice of the polarities of the layers of switch 60 is appropriate for achieving the desired different levels of conductivity. It is common in n-type III–V semiconductors to have a relatively high conductivity (low resistivity) as required for highly conducting upper contact layer 76, lower cladding layer 74, and substrate 82, whereas p-type III–V semiconductor material is typically more highly resistive, as required for upper cladding layer 70. Of course, opposite polarities, while not preferred, are within the scope of the present invention.

Referring again to FIG. 3, it is necessary for the preferred embodiment that modulator absorbing layers of switches 52 have band gap energies that are above, but not too far above, the photon energies provided by optical power beams 56 with wavelengths $\lambda_4$, $\lambda_5$, and $\lambda_6$. For most communications systems operating near 1.5 μm wavelengths, $\lambda_4$, $\lambda_5$, and $\lambda_6$ are close enough that this may be accomplished by identical switches. Alternately, switches in different columns may vary to accommodate more widely ranging wavelengths.

Figure 9:
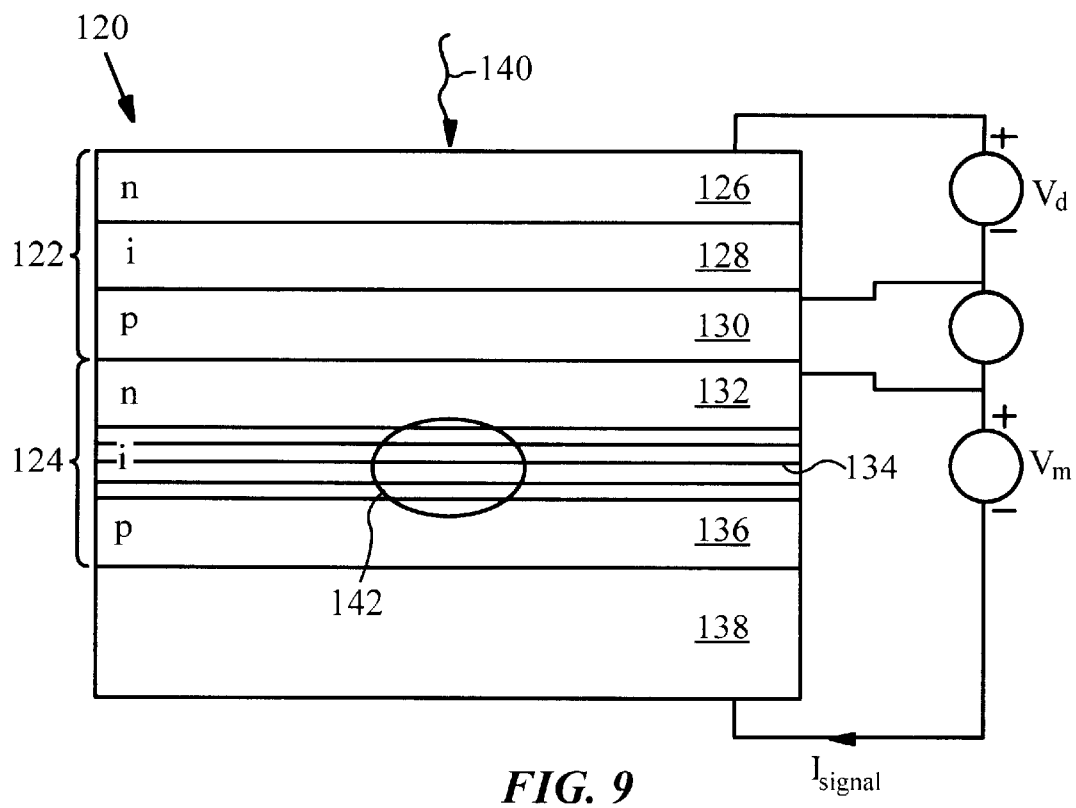
FIG. 9 is a side plan view of a preferred embodiment of a gated photodetector of the present invention.

FIG. 9 shows an alternate view of a device incorporating the principles of switch 60. In particular, device 120 acts as an optically gated photodetector. While device 120 is shown more schematically than switch 60 for simplicity, it is to be understood that device 120 may also include a ridge for lateral mode confinement, side contacts similar to side contacting material 83 of FIG. 4, and other particular features. Device 120 may also be included in an array of such devices.

Device 120 shares many of the features of switch 60. It contains a detector diode 122 and a modulator diode 124. While these names are used to emphasize the similarities between the two devices, it may be more useful to think of detector diode 122 as a gating diode, and modulator diode 124 as a photodetector. Detector diode 122 contains an upper contact layer 126, a detector absorbing layer 128, and a lower contact layer 130. Modulator diode 124 contains an upper cladding layer 132, a modulator absorbing layer 134, preferably a quantum well material, and a lower cladding layer 136. Doping types of the layers are preferably as shown in FIG. 9, but may also be opposite to what is illustrated. Both diodes are preferably reverse biased, and the voltage across modulator diode 124 is applied through substrate 138. When device 120 is used as a gated photodetector, the relevant output is a photocurrent, $I_{signal}$, generated in modulator diode 124 as a result of absorption in modulator absorbing layer 134. Photocurrent $I_{signal}$ is collected and measured using standard means known in the art.

The principal difference in device 120 is that the diode orientations, with respect to each other, are opposite from their orientations in switch 60. As a result, the field polarity is in the same physical direction in detector diode 122 and modulator diode 124. This is in contrast to switch 60, in which the field polarities are in opposite directions. Note that in switch 60, the p-type layers are identical, while in device 120, there are separate lower contact layer 130 and upper cladding layer 132, in planar parallel physical contact and of opposite semiconductor doping types. In the case of the gated photodetector, device 120, absorption of a signal pulse 140 causes field screening in detector diode 122 that leads to a transient increase in the magnitude of the field across modulator diode 124. Absorption of an optical power beam in modulator absorbing layer 134 is therefore increased, leading to an increased current $I_{signal}$. A pulse 140 absorbed by detector diode 122 therefore triggers a signal current, and the device can be seen to act as a gated photodetector. Note that $I_{signal}$ is affected only by modulator diode 124, and not by pulse absorption in detector diode 122. There is therefore no need to subtract a background of current caused by the signal absorption, and no concern for associated effects, such as shot noise of the background current or fluctuations in the detector diode power.

In device 120, the recovery of the screening is controlled by the combined resistivities of lower contact layer 130 and upper cladding layer 132, as lateral diffusive electrical conduction must occur in both layers for fields to relax to the unperturbed states. These resistivities are chosen so that relaxation occurs on the required picosecond time scale. In particular, the resistance per square for both lower contact layer 130 and upper cladding layer 132 are substantially larger than the resistance per square for upper contact layer 126 and lower cladding layer 136. As with switch 60, upper contact layer 126, lower cladding layer 136, and substrate 138 are designed to have very high conductivities, in order that the total voltage across device 120 remains effectively constant as light is absorbed.

In general, for both devices 60 and 120, optical signal pulses 84 of FIG. 4 and 140 of FIG. 9 are of a different wavelength than the optical power beam, seen as mode 66 of FIG. 4 or mode 142 of FIG. 9. Preferably, optical signal pulse 84 or 140 is of a longer wavelength, so that its photon energy is below the band gap energy of modulator absorbing layer 72 or 134. Even under reverse bias, it therefore should not be absorbed by modulator absorbing layer 72 or 134.

Many alternate embodiments of switch 60 and device 120 are within the scope of the present invention. Additional transparent conducting material, such as indium tin oxide, may be added to the top of switch 60 or device 120 to further improve the conductivity of the top layers if desired for faster operation. This additional conducting material may serve as the top contact layer, or it may be used in conjunction with existing top contact layer 80 to make a more highly conducting top contact layer. If such additional transparent conducting material is used, the present top contact layer need not be highly conducting. An anti-reflection coating could also optionally be applied above contacting material 80 to improve the efficiency of the absorption of optical signal pulse 84 by detector diode 64. An indium tin oxide layer could also be used to form such an antireflection coating. In addition, resonator structures can be employed to improve the degree of optical modulation, as is well known in the art.

Modulator absorbing layer 72 may be a bulk semiconductor, especially in combination with a waveguide structure, and not a quantum well structure. Bulk semiconductors also display field-dependent absorption according to the Franz-Keldysh effect, although this is primarily a broadening of the band edge, with comparably little shift. However, this effect does allow absorption of photon energies below the band gap. Without carrier confinement of excitons in the quantum wells, much larger voltages are needed to induce absorption, and resulting devices require significantly higher power inputs. In most cases, quantum wells are greatly preferred to thicker semiconductor bulk layers.

It is also possible to use coupled quantum wells, as discussed by Islam et al., "Electroabsorption in GaAs/AlGaAs coupled quantum well waveguides," *Appl. Phys. Lett.*, 50, 1098–1100 (1987), or superlattice structures, as discussed by Bleuse et al., "Blue shift of the absorption edge in AlGaInAs—GaInAs superlattices: Proposal for an original electro-optical modulator," *Appl. Phys. Lett.*, 53, 2632–2634 (1988), both of which are herein incorporated by reference, instead of quantum wells for modulator absorbing reign 72. Coupled quantum wells and superlattices tend to show an optical absorption edge that moves to shorter wavelengths with increasing electric field, the opposite behavior from that of quantum wells or bulk semiconductor materials. With superlattices or coupled quantum wells, because of the reversal of the effect, it is then more advantageous to use the structure of FIG. 9 for the cross-connect and that of FIG. 4 for gated detection.

Figure 10:
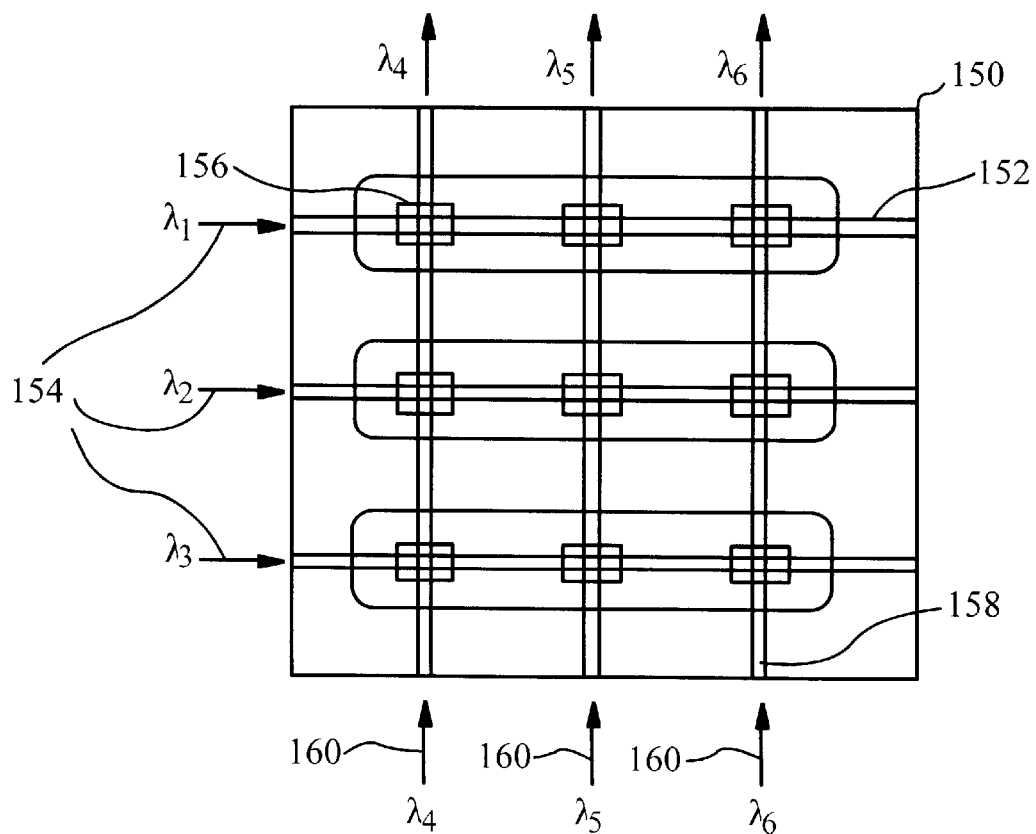
FIG. 10 is a schematic diagram of a wavelength-division multiplexed system incorporating an alternate embodiment of an optical cross-connect of the present invention.

Various extensions of optical cross-connects 10 and 50 are also possible. Waveguides may be used to bring in optical input signals 54 of FIG. 3. This configuration is shown in cross-connect 150 of FIG. 10, in which optical waveguides 152 are used to deliver optical input signals 154 to switches 156. Such waveguides 152 are laid on top of waveguides 158 used for optical power beams 160 and substantially perpendicular to waveguides 158.

The electric control signals may be applied to top contacting material 80, side contacting material 83, and substrate 82 by solder bonding of the cross-connect onto an integrated circuit. It is also obviously possible to operate cross-connect 50 with more than three optical signal wavelengths and three optical power wavelengths. Cross-connect 50 may also explicitly contain dispersive means to divide multiple wavelengths into separate beams and means to recombine signals at multiple wavelengths into a single beam. These means are currently used in WDM systems and are well known in the art. Lenslets may also be used for more efficient coupling of light into detector diodes 64.

It would also be possible to operate optically controlled optical switch 60 in bistable or self-linearized modes, allowing possible improved digital or analog performance, respectively. Such bistable and self-linearized modes have been discussed for optically controlled optical switches by D. A. B. Miller, D. S. Chemla, T. C. Damen, T. H. Wood, C. A. Burrus, A. C. Gossard and W. Wiegmann, "The Quantum Well Self-Electrooptic Effect Device: Optoelectronic Bistability and Oscillation, and Self Linearized Modulation," *IEEE J. Quantum Electron.* QE-21, 1462–1476 (1985), which is herein incorporated by reference.

It will be clear to one skilled in the art that the above embodiments may be altered in many ways without departing from the scope of the invention. Accordingly, the scope of the invention should be determined by the following claims and their legal equivalents.

What is claimed is:

1. A semiconductor device for modulating an optical power light beam at a first wavelength with an optical signal light beam at a second wavelength, said semiconductor device comprising:
    a) a detector diode comprising an upper contact layer; a detector absorbing layer for absorbing said optical signal light beam, and an upper cladding layer, said detector absorbing layer being located between said upper contact layer and said upper cladding layer;
    b) a modulator diode comprising said upper cladding layer, a modulator absorbing layer for absorbing said optical power light beam, and a lower cladding layer, said modulator absorbing layer being located between said upper cladding layer and said lower cladding layer and having an electric field-dependent absorption coefficient;
    c) a first voltage source connected across said upper contact layer and said upper cladding layer for applying a reverse bias voltage $V_d$ to said detector diode;
    d) a second voltage source connected across said upper cladding layer and said lower cladding layer for applying a reverse bias voltage $V_m$ to said modulator diode;
    e) an electric contact to said upper cladding layer for allowing a net charge to flow into and out of said semiconductor device for supporting diffusive electrical conduction in said upper cladding layer;
wherein said optical signal light beam absorbed in said detector absorbing layer causes a local change in said detector diode reverse bias voltage $V_d$ and causes a related local change in said modulator diode reverse bias voltage $V_m$ thus altering said absorption coefficient of said modulator absorbing layer.

2. The semiconductor device of claim 1, wherein:
    a) said optical power light beam has a power beam diameter and propagates into a region of said modulator absorbing layer;
    b) said optical signal light beam propagates into a region of said detector absorbing layer; and
    c) said region of said modulator absorbing layer is within a short distance from said region of said detector absorbing layer.

3. The semiconductor device of claim 2, wherein said region of said detector absorbing layer is substantially above said region of said modulator absorbing layer.

4. The semiconductor device of claim 2, wherein said short distance from said region of said detector absorbing layer is less than said power beam diameter.

5. The semiconductor device of claim 2, wherein said short distance from said region of said detector absorbing layer is less than 20 µm.

6. The semiconductor device of claim 2, wherein said upper contact layer and said lower cladding layer have a sufficiently high electrical conductivity that a voltage between said upper contact layer and said lower cladding layer is substantially constant.

7. The semiconductor device of claim 6, wherein said upper cladding layer has a predetermined resistivity chosen to control a rate of said diffusive electrical conduction in said upper cladding layer.

8. The semiconductor device of claim 6, wherein a resistance per square of said upper cladding layer is substantially larger than a resistance per square of said upper contact layer and a resistance per square of said lower cladding layer.

9. The semiconductor device of claim 1, further comprising means for collecting a photocurrent produced by absorption of said optical power light beam by said modulator absorbing layer.

10. The semiconductor device of claim 1, wherein said modulator absorbing layer comprises at least one quantum well.

11. An optical cross-connect for modulating a set of M optical power light beams with a set of N optical signal light beams to generate a set of M optical output beams, said cross-connect having an array of optical switches for modulating at least one of said optical power light beams with at least one of said optical signal light beams to generate one of said optical output beams, each of said optical switches comprising:
   a) a detector diode comprising an upper contact layer, a detector absorbing layer for absorbing at least one of said optical signal light beams, and an upper cladding layer, said detector absorbing layer being located between said upper contact layer and said upper cladding layer;
   b) a first voltage source connected across said upper contact layer and said upper cladding layer for applying a reverse bias voltage $V_d$ to said detector diode;
   c) a modulator diode comprising said upper cladding layer, a modulator absorbing layer for absorbing at least one of said optical power light beams, and a lower cladding layer, said modulator absorbing layer being located between said upper cladding layer and said lower cladding layer and having an electric field-dependent absorption coefficient;
   d) a second voltage source connected across said upper cladding layer and said lower cladding layer for applying a reverse bias voltage $V_m$ to said modulator diode;
   e) an electric contact to said upper cladding layer for allowing a net charge to flow into and out of said optical cross-connect for supporting diffusive electrical conduction in said upper cladding layer;
such that in each of said optical switches the absorption of at least one of said optical signal light beams by said detector absorbing layer causes a local change in said detector diode reverse bias voltage $V_d$ and causes a related local change in said modulator diode reverse bias voltage $V_m$ thus altering the absorption coefficient of said modulator absorbing layer and modulating at least one of said power light beams.

12. The optical cross-connect of claim 11, wherein each of said optical signal light beams is of a different wavelength and each of said optical power light beams is of a different wavelength.

13. The optical cross-connect of claim 11, wherein said array of optical switches comprises N rows and M columns of optical switches.

14. The optical cross-connect of claim 11, further comprising a set of optical waveguides for delivering said optical power light beams to said optical switches and for delivering said optical output beams from said optical switches.

15. The optical cross-connect of claim 11, wherein each of said modulator absorbing layers comprises at least one quantum well.

16. The optical cross-connect of claim 11, wherein:
   a) each of said optical power light beams has a power beam diameter and propagates into a region of one of said modulator absorbing layers;
   b) each of said optical signal light beams propagates into a region of one of said detector absorbing layers; and
   c) said region of said modulator absorbing layer is within a short distance from said region of said detector absorbing layer.

17. The optical cross-connect of claim 16, wherein said region of said detector absorbing layer is substantially above said region of said modulator absorbing layer.

18. The optical cross-connect of claim 16, wherein said short distance is less than said power beam diameter.

19. The optical cross-connect of claim 16, wherein said short distance is less than 20 $\mu$m.

20. The optical cross-connect of claim 11, wherein said upper cladding layer has a predetermined resistivity chosen to control said diffusive electrical conduction in said upper cladding layer.

21. The optical cross-connect of claim 20, wherein a resistance per square of said upper cladding layer is substantially larger than a resistance per square of said upper contact layer and a resistance per square of said lower cladding layer.

* * * * *